Figure 1:
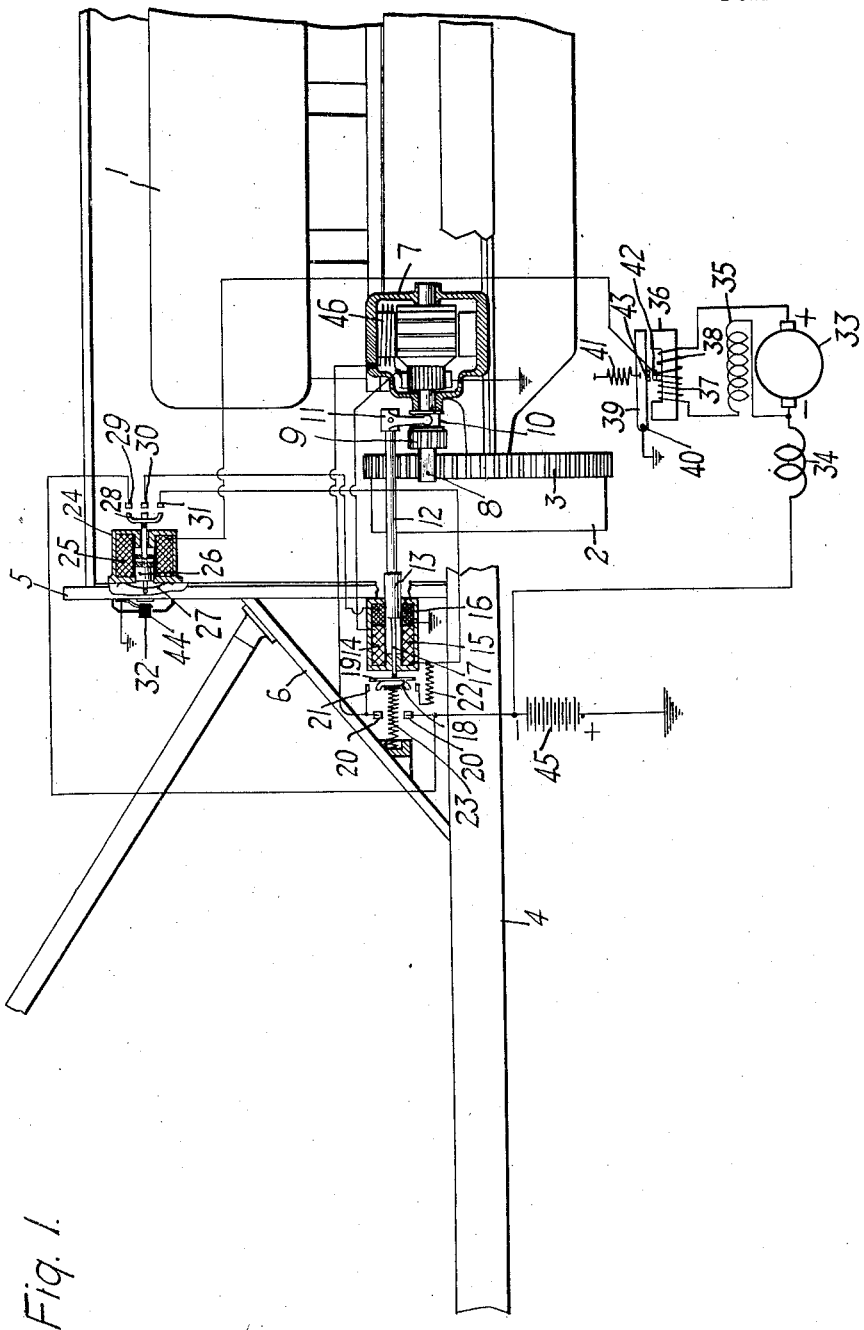

F. CONRAD.
STARTING SYSTEM FOR AUTOMOBILES.
APPLICATION FILED JUNE 5, 1913.

1,246,717.

Patented Nov. 13, 1917.
2 SHEETS—SHEET 1.

WITNESSES:
R. J. Ridge
J. R. Langley

INVENTOR
Frank Conrad
BY
Wesley G. Carr
ATTORNEY

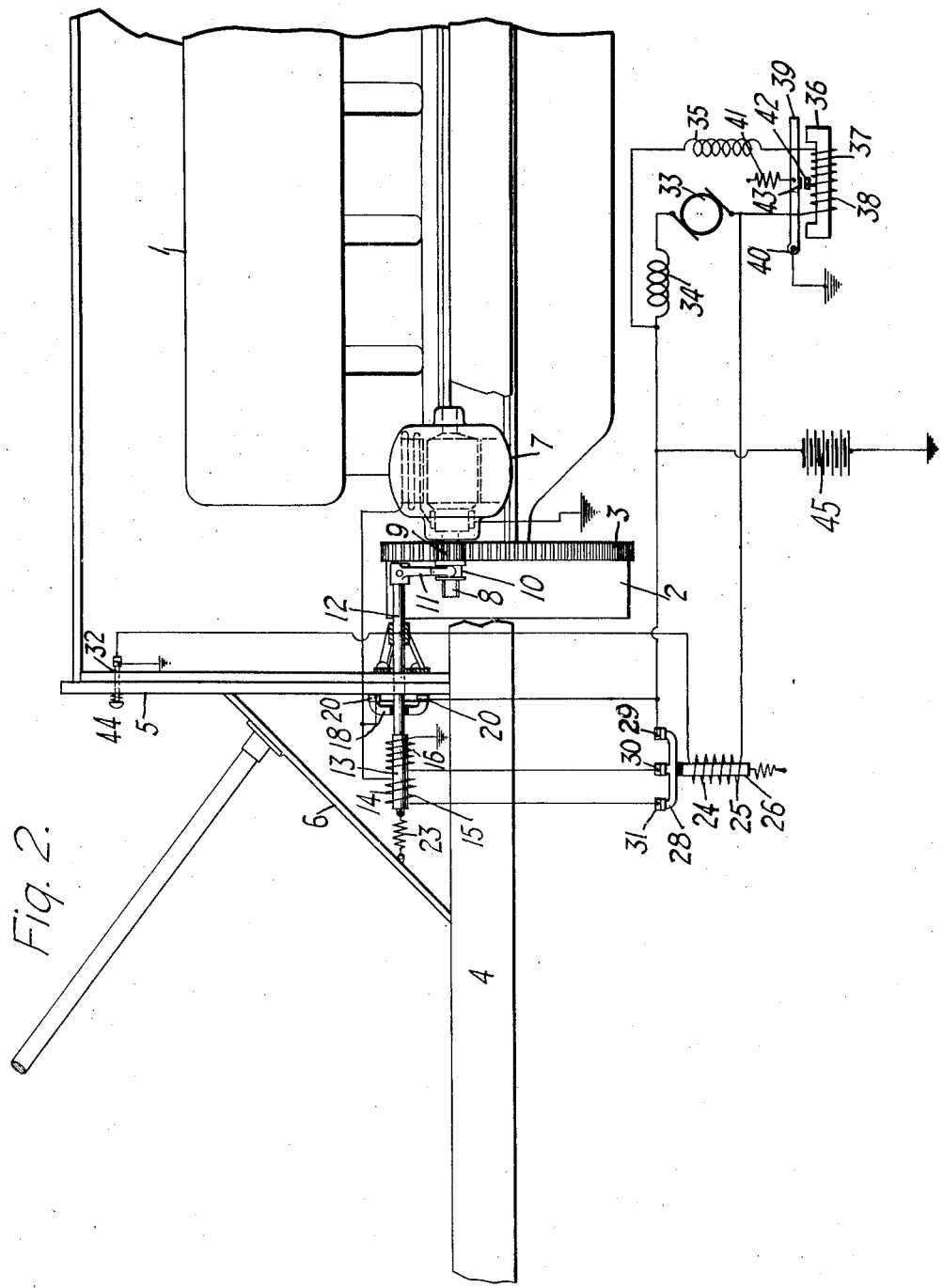

UNITED STATES PATENT OFFICE.

FRANK CONRAD, OF SWISSVALE, PENNSYLVANIA, ASSIGNOR TO WESTINGHOUSE ELECTRIC AND MANUFACTURING COMPANY, A CORPORATION OF PENNSYLVANIA.

STARTING SYSTEM FOR AUTOMOBILES.

1,246,717. Specification of Letters Patent. Patented Nov. 13, 1917.

Application filed June 5, 1913. Serial No. 771,893.

*To all whom it may concern:*

Be it known that I, FRANK CONRAD, a citizen of the United States, and a resident of Swissvale, in the county of Allegheny and State of Pennsylvania, have invented a new and useful Improvement in Starting Systems for Automobiles, of which the following is a specification.

My invention relates to starting systems for automobiles and it has particular reference to such systems as employ separate dynamo-electric machines for starting gas engines of motor vehicles and for furnishing current for lighting, ignition and charging storage batteries.

My invention has for one of its objects to provide a system of the character indicated above which is simple in its construction and automatic in its operation to control the mechanical and electrical connections of an electric motor and an electric generator.

A further object of my invention is to provide a system which will effectually prevent any damage to the connecting gear mechanism because of an attempt to operatively connect the motor to the engine while the latter is running at a high rate of speed.

In the systems in use in connection with motor vehicles, it is the practice, to some extent, to effect the meshing of connecting gear wheels and to control the circuits of dynamo-electric machines by manually operated devices.

The operator must determine the proper time to make the several necessary adjustments and any mistake in judgment or inadvertence on the part of the operator may cause damage to the gear mechanism or to the motor by operating it at an excessive speed.

I propose to provide a system in which all necessity for the attention of the operator to the details of the starting operation is avoided. It is only necessary for the operator to press a conveniently placed button, to cause the system to automatically and successively effect the meshing of the gear wheels which connect the motor to the engine, the closing of the motor circuit, the opening of the motor circuit, and the disengagement of the gear wheels.

The details of my invention will be described in connection with the accompanying drawings in which Figure 1 is a side view, partially in elevation and partially in section, of a portion of an automobile with my invention applied thereto, the electrical circuits and certain of the apparatus being illustrated diagrammatically.

Fig. 2 is a view, similar to Fig. 1, of a modification of my invention.

Referring to Fig. 1, an automobile comprises the usual engine 1 having a fly wheel 2 that is provided with gear teeth 3. Frame members of the automobile chassis are indicated at 4, and 5 and 6 designate a dashboard and a foot board, respectively. An electric motor 7 is attached by any suitable means to the engine structure or to the automobile chassis. The motor 7 is provided with an armature shaft 8 upon which a pinion 9 is mounted to slide into and out of mesh with the gear teeth 3 on the fly wheel 2. The pinion 9 is provided with an integral grooved collar 10 to be engaged by a yoke member 11 that is fixed to a slidable shift rod 12 at the forward end of the latter.

The rod 12 passes through a suitable opening in the dash board 5 and is provided with an enlarged portion 13 which constitutes the movable core member of an electro-magnet 14 that comprises coils 15 and 16. The rod 12 is also provided with a reduced portion 17 upon which are mounted movable contact members 18 and 19 which coact, respectively, with fixed contact members 20 and contact clips 21. A resistor 22 is connected between one contact clip 21 and one terminal of the magnet coil 15. The several contact members 18, 19, 20 and 21 and the resistor 22 form the controlling switch for the motor 7. A spring 23 is interposed between the rear end of the shift rod 12 and a suitable stationary part to normally hold the rod 12 in its forward position.

An electromagnet 24, which is mounted on the dash board 5, comprises a coil 25 and a movable core member 26 that is normally restrained by a spring 27. A movable contact member 28 is fixed to the core member 26 to coact with fixed contact members 29, 30 and 31 to control the circuits of the coils 15 and 16. A push button switch 32 controls the circuit of the magnet coil 25 and, thereby, the position of the movable switch member 28.

A generator, the armature of which is indicated at 33, is provided with a series field winding 34 and a shunt field winding 35. The electrical connections of the generator are controlled by an automatic cutout which comprises a core member 36, coils 37 and 38 and an armature 39 having a pivotal support indicated at 40 and normally held upward by a spring 41. The coils 37 and 38 are connected to a contact member 42 which coacts with a contact member 43 mounted upon and electrically connected to the armature 39.

It may be assumed that the engine is stationary and that the various parts are in their respective inoperative positions. When it is desired to start the engine, the operator presses a button 44 to close a circuit from the ungrounded terminal of a storage battery 45 through the series field winding 34, generator armature 33, coil 38, contact member 42, winding 25 and switch 32 to ground and back to the battery. The winding 25 is energized to draw the core member 26 forwardly and thus connect the contact members 28, 29, 30 and 31. A circuit is thus completed from the ungrounded terminal of the battery 45, through the contact members 29, 28 and 30 and the coil 16 to ground. A second circuit is also closed which extends from the battery through the contact members 29, 28 and 31, the coil 15 and the armature winding of the motor 7 to ground. The coils 15 and 16 are thus energized to shift the rod 12 backwardly to simultaneously shift the pinion 9 and the movable contact members 18 and 19. The contact member 19 first engages the contact members 21 to close temporarily a shunt circuit for the coil 15 through the resistor 22, contact members 21 and 19 and the motor field winding 45 back to the coil 15. The shunt circuit above traced completes the motor circuit to cause the motor to rotate slowly because the resistor 22 is in circuit therewith. The circuit is almost immediately broken but the motor continues to rotate slowly by reason of its inertia as the pinion 9 is shifted into mesh with the gear teeth 3 of the fly wheel 2. The further shifting of the rod 12 connects the contact member 18 with the contact members 20 to complete the running circuit of the motor from the battery through contact members 20 and 18, motor field winding 46 and the motor armature to ground. The coil 15 is then short circuited and the coil 16 acts as a retaining coil to hold the rod 12 in its shifted position. The motor then operates at a high speed to rotate the engine shaft (not shown).

When the engine starts under its own power, the generator, which is connected to the engine by any suitable means (not shown), is operated at an increasing speed. The electromotive force of the generator opposes that of the battery and thus decreases the electromotive force applied to the magnet coil 25. When the effective electromotive force reaches a minimum that is determined by the strength of the spring 27, the switch member 28 is withdrawn to break the circuit of the coil 16 and allow the spring 23 to return the shift rod 12 to its normal position. As a result, the motor circuit is broken and the pinion 9 is disengaged from the gear teeth 3. The push button is then ineffective to operate the magnetic switch 24.

As the generator speed increases, the voltage reaches a value at which the coils 37 and 38 are sufficiently energized to draw the armature 39 downwardly to connect the contact members 42 and 43. The charging circuit of the generator is thus completed from the positive terminal of the generator through the coil 38, contact members 42 and 43, armature 39 to ground, the battery 45, and series field winding 34 to the negative terminal of the generator. The charging circuit will remain closed as long as the generator voltage exceeds that of the battery.

When the generator voltage is less than that of the battery, the latter will tend to discharge back through the generator and, consequently, current will flow in the reverse direction through the series coil 38. The coils 37 and 38, which normally assist one another, are now opposed and, as a result, the armature 39 is released to break the charging circuit. The cut out 36 thus automatically controls the charging circuit and prevents the battery from discharging back through the generator except during the closure of the push button switch 32 in starting.

A modification of the above described system is illustrated in Fig. 2, in which like numerals are used to designate corresponding parts. Since the two forms of my invention differ only slightly, the description of the system shown in Fig. 2 will be limited to those details of construction and operation which differ in some particular from the system above described. The electro-magnets 14 and 24 are shown diagrammatically in the modification, but their arrangement and construction may be substantially similar to what is shown in Fig. 1. The shift rod 12 is actuated in directions opposite to those employed in the first form of my invention to effect the meshing and disconnection of the pinion 9 and gear teeth 3, respectively. The contact member 18, contact clips 21 and the resistor 22 are omitted, the coil 15 being employed as a resistor to start the motor slowly.

In operation, the button 44 is pressed to close the circuit of the electromagnet 24 and the movable member 28 completes circuits from the battery through the coils 15 and 16, respectively. The coil 15 is in series with the motor armature and serves as a resistor to insure the slow rotation of the motor. The shift rod 12 is actuated forwardly to slide the pinion 9 into mesh with the gear teeth 3 and to connect the contact members 18 and 20. The coil 15 is now short circuited and the coil 16 acts as a holding coil while the engine is being started. The further operation of the various parts is as above described in connection with Fig. 1.

It will be readily understood from the foregoing description of construction and operation that I have provided a system which automatically controls the starting mechanism during the entire operation of starting the engine and which prevents the connection of the gear mechanism when the engine operates at a relatively high speed. The ease and convenience with which the gas engine may be started and the battery recharged by my starting system and the safety with which it may be operated, are advantages which will be appreciated by those skilled in the art to which my invention appertains.

While the generator, as employed in the system described, furnishes current for charging the battery only, it may, in addition, furnish current for an ignition system and a lighting system (not shown) without modifying, in any manner, the construction or the operation of the present system.

Such modifications may be made without departing from the spirit of my invention as fall within the limits of the appended claims.

I claim as my invention:

1. The combination with two gear wheels, one of which is shiftable into and out of mesh with the other, of a member connected to said shiftable gear wheel, an electromagnet for controlling said member and comprising two coils, and means for controlling the connections of said coils comprising means for shunting one of said coils.

2. The combination with a gear wheel, of a second gear wheel shiftable into and out of mesh therewith, means for controlling said shiftable gear, said means comprising an electromagnet having two coils, a switch for controlling the connections of said coils, and a switch controlled by said electromagnet for shunting one of said coils.

3. The combination with two gear wheels, one of which is shiftable into and out of mesh with the other, of a member connected to said shiftable gear wheel, an electromagnet for controlling said member and comprising two coils wound to assist each other, and means for shunting one of said coils, said means comprising a switch mounted on said member.

4. The combination with an engine shaft, a motor and gear wheels for operatively connecting said motor to said shaft, of electro-responsive means for controlling the engagement of said gear wheels, said means comprising a coil, means for connecting said coil in series with said motor, and means for shunting said coil.

5. The combination with an engine shaft, a motor and gear mechanism for operatively connecting said motor to said shaft, of means for controlling said connecting means and comprising a magnetically controlled member, a plurality of coils surrounding said member, means for connecting one of said coils in circuit with said motor, and means for shunting said one coil.

6. The combination with an engine shaft, a motor and means for operatively connecting said motor to said shaft, of an electro-magnet for controlling said operative connection and comprising a coil, means for connecting said coil in circuit with said motor, and means for shunting said coil when said motor is operatively connected to said shaft.

7. The combination with a gas engine, a motor, means for operatively connecting said motor to said engine shaft, a storage battery, and electrical connections for said several devices, of electro-responsive means operating to successively effect the engagement of said connecting means, connect said motor in circuit with said battery, break said motor circuit and disengage said connecting means.

8. The combination with an engine shaft, a motor, a source of electromotive force and means for operatively connecting said motor to said shaft, of electro-responsive means for successively effecting the engagement of said connecting means, connecting said motor in circuit with said source of electromotive force, breaking said circuit, and disengaging said connecting means, and a manually operable member for controlling said electro-responsive means.

In testimony whereof, I have hereunto subscribed my name this 31st day of May, 1913.

FRANK CONRAD.

Witnesses:
B. B. HINES,
C. E. WILSON.